(12) United States Patent
Vernola

(10) Patent No.: US 7,520,065 B2
(45) Date of Patent: Apr. 21, 2009

(54) LEVEL WITH INTEGRAL CLAMP FOR MOUNTING CONDUIT APPARATUS AND METHOD

(76) Inventor: Bryan Vernola, 114 Evergreen Rd., Vernon, CT (US) 06066

( * ) Notice: Subject to any disclaimer, the term of this patent is extended or adjusted under 35 U.S.C. 154(b) by 14 days.

(21) Appl. No.: 11/759,294

(22) Filed: Jun. 7, 2007

(65) Prior Publication Data

US 2008/0301957 A1 Dec. 11, 2008

(51) Int. Cl.
*G01C 9/26* (2006.01)
(52) U.S. Cl. .......................... 33/371; 33/381
(58) Field of Classification Search ................ 33/370, 33/371, 372, 373, 381
See application file for complete search history.

(56) References Cited

U.S. PATENT DOCUMENTS

| | | | | |
|---|---|---|---|---|
| 1,401,146 A | * | 12/1921 | Falconer | 33/373 |
| 2,541,641 A | * | 2/1951 | Dodson | 33/373 |
| 3,545,091 A | * | 12/1970 | Sebastiani | 33/372 |
| 4,829,676 A | * | 5/1989 | Waldron | 33/372 |
| 5,505,001 A | * | 4/1996 | Schaver, Jr. | 33/371 |
| 6,070,336 A | * | 6/2000 | Rodgers | 33/370 |
| 6,131,298 A | * | 10/2000 | McKinney et al. | 33/372 |
| 7,059,059 B1 | * | 6/2006 | Ames | 33/372 |
| 7,316,074 B2 | * | 1/2008 | Tran et al. | 33/379 |
| 7,398,600 B2 | * | 7/2008 | Ming | 33/379 |
| 2003/0136013 A1 | * | 7/2003 | Charay et al. | 33/370 |

* cited by examiner

*Primary Examiner*—G. Bradley Bennett
(74) *Attorney, Agent, or Firm*—Robert S. Smith

(57) ABSTRACT

Apparatus for installing conduit which includes an elongated transparent vial having a geometric axis and containing a liquid defining a bubble therein whereby when the axis is horizontal the bubble is centered with respect to the elongated transparent vial and an elongated housing having a geometric axis. The elongated transparent vial is mounted in the housing with the geometric axis of the vial being parallel to the geometric axes of the housing, the housing has a first planar surface extending parallel to both the geometric axis of the vial and the geometric axes of the housing, the housing including first and second magnets disposed in the first planar surface the first planar surface having a first recess extending away from the first planar service, the first and second magnets are disposed in spaced relationship in the first planar surface with the first recess intermediate the first and second magnets, the first recess is dimensioned and configured for receiving in closely spaced relationship an associated conduit.

11 Claims, 4 Drawing Sheets

LEVEL WITH INTEGRAL CLAMP FOR MOUNTING CONDUIT APPARATUS AND METHOD

FIELD OF THE INVENTION

The invention has particular application to methods and apparatus for building construction and more particularly for tools used in building construction such as tools used for installing electrical conduit commonly known as EMT conduit. While the apparatus and method in accordance with the present invention has particular application for mounting such conduit, those skilled in the art will recognize also has application to other situations.

BACKGROUND OF THE INVENTION

A carpenter's/electrician's level contains a varying number of transparent bubble vials mounted in a wood, plastic, or metal frame. The tool is used to check that surfaces are level (horizontally aligned) or plumb (vertically aligned). The tool is used by placing the level on a horizontal surface and noting the position of the bubble in the horizontal, or level, vial. When the bubble is centered between the marks on the vial, the surface is level. Similarly, by holding the level firmly against a vertical surface and checking the position of the bubble in the vertical, or plumb, vial, the user knows that when the bubble is centered, the surface is plumb.

The prior art includes a wide variety of so called torpedo levels. U.S. Pat. No. 7,152,335 discloses a torpedo level having magnetic mounting. Specifically, the structure includes magnetic elements on one or both of the side flanges. U.S. Pat. No. 5,819,425 that a clamp for temporarily attaching a level to a construction component. U.S. Pat. No. 6,332,277 discloses another apparatus attaching a level to a structural member.

In both new building construction as well as in modification of existing buildings it is often necessary to provide EMT conduit for housing respective parts of the building wiring system. The conduit is provided to protect the wiring from accidental as well as intentional impact. In some cases the conduit is metallic and is grounded as a safety precaution. New commercial construction often uses decking, often steel, on which concrete is poured. This decking typically has a lower surface that has spaced elongated recesses extending in parallel relation.

The installation process is typically performed by electrician who must typically securely attach the conduit to the ceiling area on each floor. Often, for example, the electrician will stand on a stepladder and attempt to essentially simultaneously determine the conduit is level and position in the desired location, hold the conduit in the desired position, position a clamp over the conduit, utilize an electric drill to drill pilot holes aligned with the clamp in the ceiling structure, place respective screws in the respective holes in the clamp and the corresponding pilot holes, drive the screws into the ceiling structure, while simultaneously perched precariously on the ladder. Thus, the electrician must possess agility, dexterity, and creativity to perform the necessary steps. Often the electrician must hold an electric drill between his or her knees while performing other steps of the required procedure.

SUMMARY OF THE INVENTION

It is an object to present invention provide a method and apparatus that facilitates and simplifies completion of the above described steps even by an electrician that does not possess enormous agility and dexterity.

Another object of the invention is to provide an apparatus and method that will accommodate conduit of various sizes.

Still another object of the invention is to provide an apparatus and method that facilitates achievement of the required steps without adding multiple pieces of equipment that the user must utilize and thus avoids compounding the complexity of the manipulation steps required.

It has now been found that these and other objects of the invention may be achieved in apparatus for installing conduit which includes an elongated transparent vial having a geometric axis and containing a liquid defining a bubble therein whereby when the axis is horizontal the bubble is centered with respect to the elongated transparent vial; and an elongated housing having a geometric axis, the elongated transparent vial being mounted in the housing with the geometric axis of the vial being parallel to the geometric axes of the housing, the housing having a first planar surface extending parallel to both the geometric axis of the vial and the geometric axes of the housing, the housing including first and second magnets disposed in the first planar surface the first planar surface having a first recess extending away from the first planar service, the first and second magnets being disposed in spaced relationship in the first planar surface with the first recess intermediate the first and second magnets, the first recess being dimensioned and configured for receiving in closely spaced relationship an associated conduit.

In some forms of the invention the apparatus the first and second magnets have respective planar first and second faces that are coplanar with the first planar surface. The first recess may include an arc shaped portion and first and second opposed planar portions, the plainer portions may be disposed in tangential relationship to the arc shaped portion. Some embodiments may further include a second recess that is smaller than the first recess. And other embodiments may include a third recess that is smaller than the second recess.

The invention also includes the method for installing conduit which includes providing an elongated transparent vial having a geometric axis and containing a liquid defining a bubble therein whereby when the axis is horizontal the bubble is centered with respect to the elongated transparent vial; providing an elongated housing having a geometric axis, the elongated transparent vial being mounted in the housing with the geometric axis of the vial being parallel to the geometric axes of the housing, the housing having a first planar surface extending parallel to both the geometric axis of the vial and the geometric axes of the housing, the housing may include first and second magnets disposed in the first planar surface the first planar surface having a first recess extending away from the first planar service, the first and second magnets being disposed in spaced relationship in the first planar surface with the first recess intermediate the first and second magnets, the first recess being dimensioned and configured for receiving in closely spaced relationship an associated conduit; aligning an associated conduit in horizontal orientation using the bubble in the vial; and securing temporarily an associated conduit to an associated ceiling structure utilizing the first and second magnets while providing a more permanent attachment to the associated ceiling structure.

The method may further include providing a spacer bridging at least one of the recesses and positioning the elongated housing to bridge a recess in decking whereby a conduit is positioned to be affixed to the bottom of the decking.

BRIEF DESCRIPTION OF THE DRAWING

The invention will be better understood by reference to the accompanying drawing in which.

DESCRIPTION OF THE PREFERRED EMBODIMENTS

Figure 1:
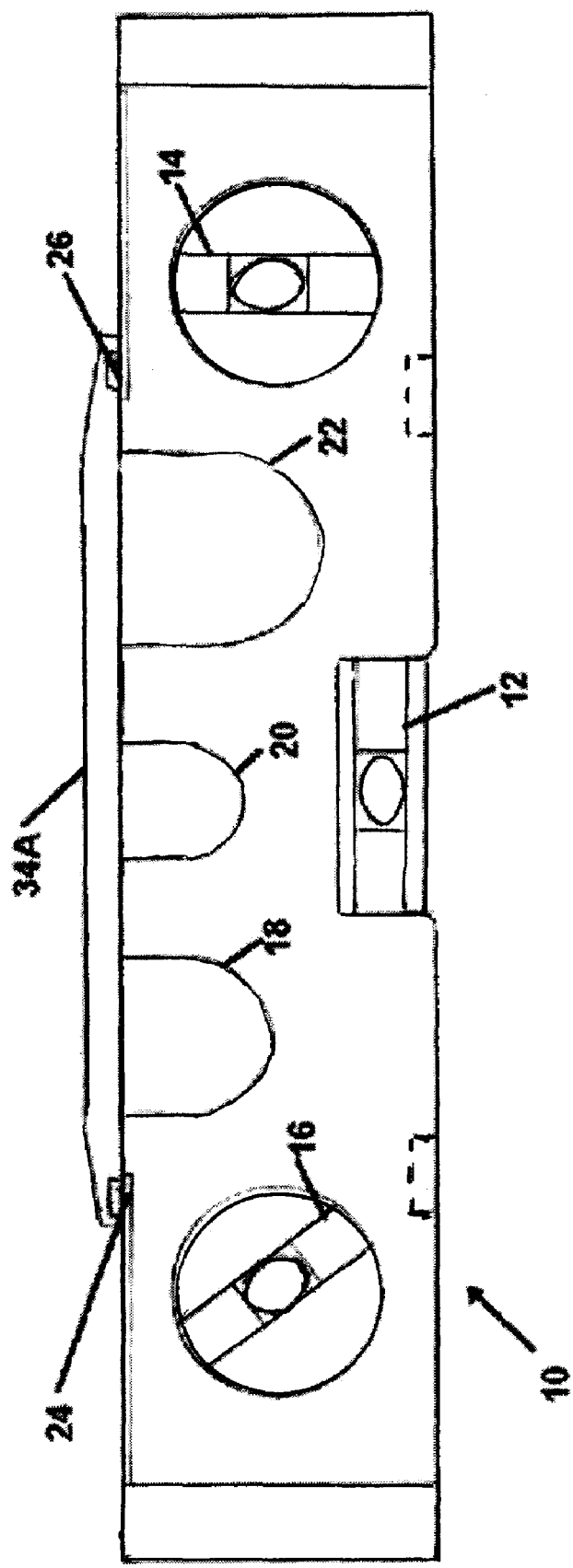
FIG. 1 is a front view of one form of the apparatus in accordance with the present invention.
Figure 2:
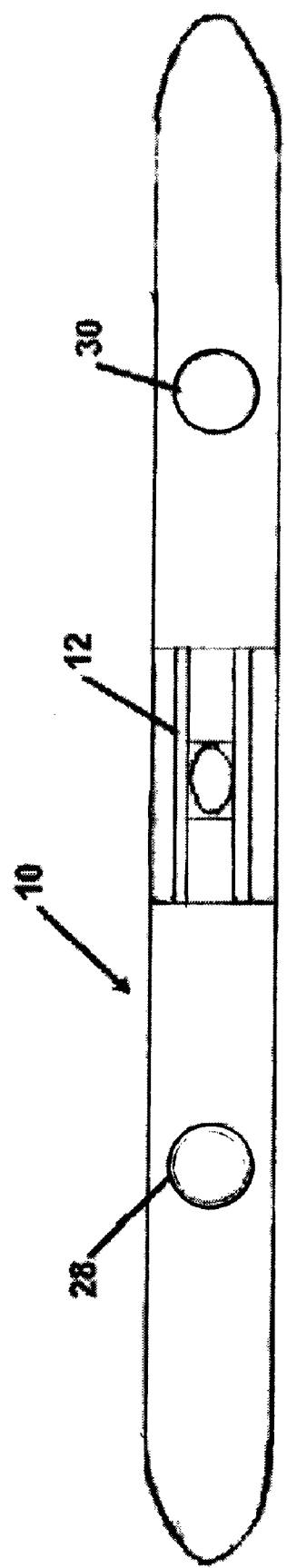
FIG. 2 is a bottom view of the apparatus shown in FIG. 1.
Figure 3:
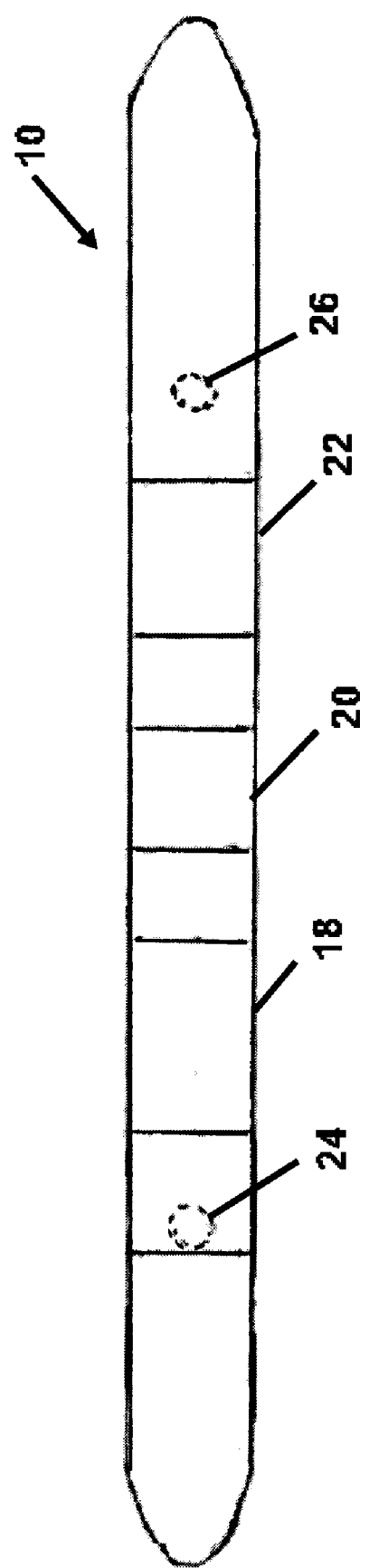
FIG. 3 is a top view of the apparatus shown in FIG. 1.

Referring now to FIGS. 1-4 there is shown apparatus in accordance with one form of the present invention. The apparatus includes a torpedo level 10 having a housing having a major axis that extends in the direction of elongation. The level 10 includes three elongated transparent vials 12, 14, 16 each containing a liquid in which an elongated bubble is disposed in the conventional manner. The elongated transparent vials 12, 14, 16 are disposed respectively in parallel, perpendicular, and oblique relation two of the major axis of the torpedo level 10. Also in the conventional manner marks on the transparent files 12, 14, 16 are provided to indicate the location of the respective bubble at the midpoint of the vial.

Ordinarily the housing is manufactured of Nylon or aluminum. The housing is provided with three recesses 18, 20, 22. Each of these recesses has an open upper extremity, as viewed me front view of FIG. 1, an arcuate lower extremity with parallel opposed sidewalls extending tangentially from diametrically opposed parts of the arcuate lower extremity to the open the upper extremity. In a preferred embodiment the distance between the respective opposed side walls and the diameter of their respective arcuate lower extremities all the recesses 18, 20, 22 are substantially ¾ inch, ½ inch, and 1 inch. Thus, the recesses 18, 20, 22 correspond to the most common sizes of EMT conduit. Preferably, the largest recesses are disposed adjacent to one of the magnets 24 or 26.

Disposed along the top surface of the level 10 are 26 separated by the recesses 18, 20, 22. This follows along the bottom surface of the level 10 are magnets 28, 30, separated by the vial 12.

Thus, it will be Seen then the most common application of the present apparatus, the user well, for example, position an axial portion of a conduit in one of the recesses 18, 20, 22 corresponding to size the conduit involved, position the magnets 24, 26 against a ferrous structural element to temporarily hold the conduit in position while the user more permanently secures the conduit to the billing structure. In this manner, if the user does not have to use his hands shoulders or arms to position the conduit while the permanent connection to the building structure is achieved.

Figure 4:
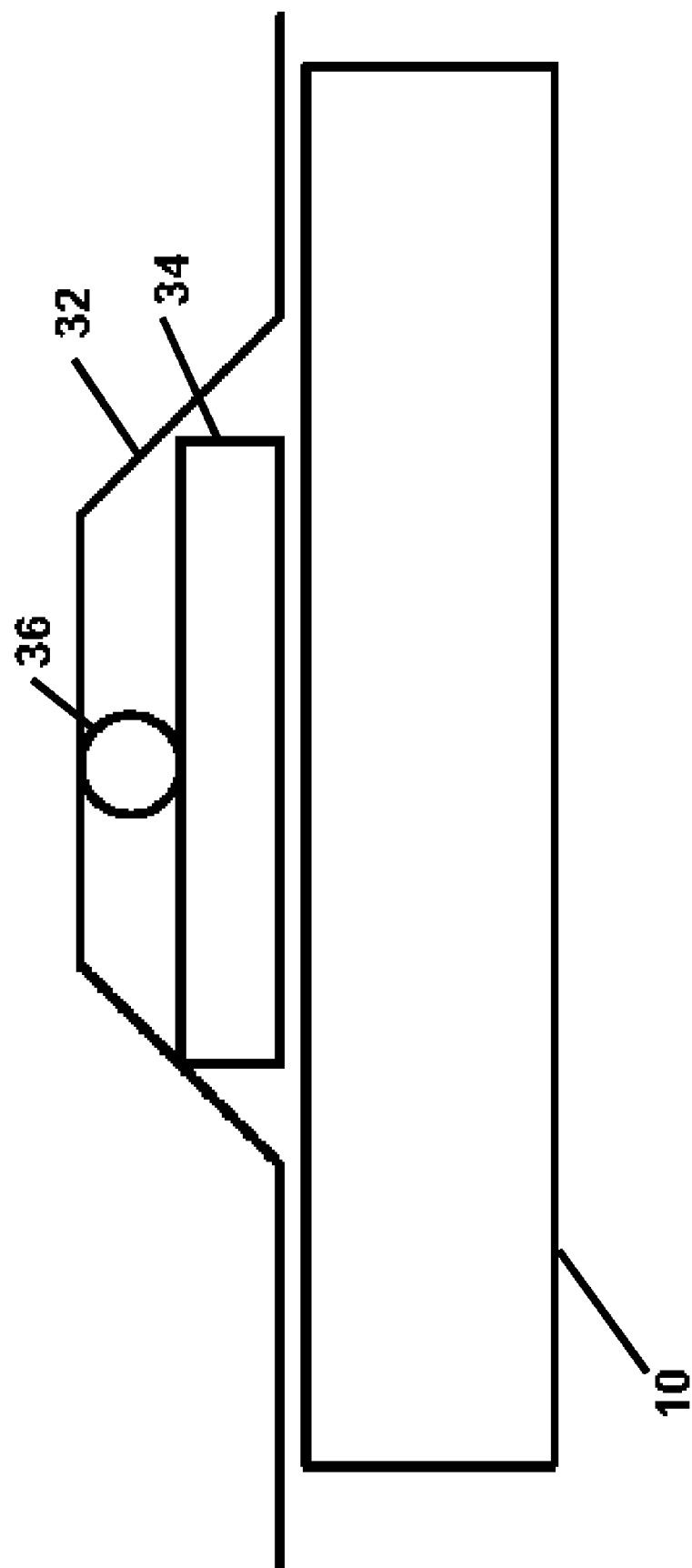
FIG. 4 is a schematic view illustrating the use of the cover bar to position a conduit with respect to floor decking that has a bottom surface that is not planar.

In some cases the conduit must be affixed to decking that does not have planar lower face. In FIG. 4 the line 32 represents schematically the lower face of such decking. Positioning the Conduit 36 in the trough defined in the decking the level 10 magnetically in bridging relationship across the trough with a bridge cover 34 acting as a spacer to hold the conduit 36. The precise dimensions of the bridge cover 34 will vary for the specific application. Although the schematic representation of FIG. 4 shows a rather thick 34, though we understood that other applications may use a relatively thin bridge cover 34a as shown and FIG. 1. It will be understood that the bridge cover includes at least some ferrous metal dimensioning configured two mate with the magnets 24, 26.

Ordinarily the user will tip the level 10 to one side to release the magnets from the building structure. This is ordinarily necessary to overcome the preferred high strength magnets. The magnets 24, 26, 28, 30 may be of various shapes without departing from the spirit of the invention. A preferred form of the magnets is a so called earth magnet manufactured of neodymium. The exposed surface of the magnets shown in the figures is not necessarily indicative of the size of the entire magnetic body. For example, the magnetic body may be much larger than the exposed part thereof.

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

I claim:

1. Apparatus for installing conduit which comprises:
    an elongated transparent vial having a geometric axis and containing a liquid defining a bubble therein whereby when said axis is horizontal said bubble is centered with respect to said elongated transparent vial; and
    an elongated housing having a geometric axis, said elongated transparent vial being mounted in said housing with said geometric axis of said vial being parallel to said geometric axes of said housing, said housing having a first planar surface extending parallel to both said geometric axis of said vial and said geometric axes of said housing, said housing including first and second magnets disposed in said first planar surface said first planar surface having a first recess extending away from said first planar service, said first and second magnets being disposed in spaced relationship in said first planar surface with said first recess intermediate said first and second magnets, said first recess having an arcuate portion and being dimensioned and configured for receiving in closely spaced relationship an associated conduit.

2. The apparatus as described in claim 1 wherein said first and second magnets have respective planar first and second faces.

3. The apparatus as described in claim 2 wherein said first and second planar faces are coplanar with said first planar surface.

4. The apparatus as described in claim 3 wherein said first recess includes an arc shaped portion and first and second opposed planar portions, said plainer portions each being disposed in tangential relationship to said arc shaped portion.

5. The apparatus as described in claim 4 further including a second recess that is smaller than said first recess.

6. The apparatus as described in claim 5 wherein said second first recess includes an arc shaped portion and first and second opposed planar portions, said planer portions each being disposed in tangential relationship to said arc shaped portion.

7. The apparatus as described in claim 6 further including a third recess that is smaller than said second recess.

8. The apparatus as described in claim 7 wherein said third recess includes an arc shaped portion and first and second opposed planar portions, said planer portions each being disposed in tangential relationship to said arc shaped portion.

9. The apparatus is described in claim 1 further including a second planar surface it is parallel to set first planar surface.

10. A method for installing conduit which comprises:
   providing an elongated transparent vial having a geometric axis and containing a liquid defining a bubble therein whereby when said axis is horizontal said bubble is centered with respect to said elongated transparent vial;
   providing an elongated housing having a geometric axis, to carry said elongated transparent vial being in said housing with said geometric axis of said vial being parallel to said geometric axes of said housing, providing said housing with a first planar surface extending parallel to both said geometric axis of said vial and said geometric axes of said housing, providing said housing with first and second magnets disposed in the first planar surface providing the first planar surface with a first recess extending away from said first planar service, disposing said first and second magnets in spaced relationship in said first planar surface with said first recess intermediate said first and second magnets, dimensioning and configuring said first recess for receiving in closely spaced relationship an associated conduit;
   aligning an associated conduit in horizontal orientation using the bubble in the vial; and
   securing temporarily an associated conduit to an associated ceiling structure utilizing the first and second magnets while providing a more permanent attachment to the associated ceiling structure.

11. The method as described in claim 10 further including providing a spacer bridging at least one of the recesses and positioning the elongated housing to bridge a recess in decking whereby a conduit is positioned to be affixed to the bottom of the decking.

* * * * *